United States Patent
Baratti et al.

(10) Patent No.: US 8,402,452 B2
(45) Date of Patent: Mar. 19, 2013

(54) AUTOMATICALLY RECOMMENDING AN UPGRADE APPROACH FOR A CUSTOMIZABLE SOFTWARE PRODUCT

(75) Inventors: Paolo Baratti, Rome (IT); Stefano Borghetti, Viterbo (IT); Leonida Gianfagna, Rome (IT); Marco Martino, Rome (IT); Attilio Mattiocco, Rome (IT); Antonio Perrone, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1021 days.

(21) Appl. No.: 12/417,000

(22) Filed: Apr. 2, 2009

(65) Prior Publication Data

US 2010/0257518 A1    Oct. 7, 2010

(51) Int. Cl.
  *G06F 9/44* (2006.01)
  *G06F 9/45* (2006.01)
(52) U.S. Cl. .................................. 717/169; 717/170
(58) Field of Classification Search .......... 717/168–174; 709/203–204
See application file for complete search history.

(56) References Cited

U.S. PATENT DOCUMENTS

| | | | |
|---|---|---|---|
| 5,485,621 A | 1/1996 | Schwanke | |
| 5,602,993 A * | 2/1997 | Stromberg | 717/173 |
| 5,758,071 A * | 5/1998 | Burgess et al. | 709/220 |
| 5,809,287 A | 9/1998 | Stupek, Jr. et al. | |
| 6,260,020 B1 | 7/2001 | Ruffin et al. | |
| 6,282,712 B1 * | 8/2001 | Davis et al. | 717/170 |
| 6,367,077 B1 * | 4/2002 | Brodersen et al. | 717/170 |
| 6,601,233 B1 * | 7/2003 | Underwood | 717/102 |
| 7,055,149 B2 * | 5/2006 | Birkholz et al. | 717/172 |
| 7,076,778 B2 * | 7/2006 | Brodersen et al. | 717/170 |
| 7,117,486 B2 | 10/2006 | Wong et al. | |
| 7,191,435 B2 * | 3/2007 | Lau et al. | 717/168 |
| 7,203,937 B1 * | 4/2007 | Kyle et al. | 717/168 |
| 7,392,522 B2 * | 6/2008 | Murray et al. | 717/174 |
| 7,398,524 B2 * | 7/2008 | Shapiro | 717/175 |
| 7,496,912 B2 * | 2/2009 | Keller et al. | 717/174 |
| 7,509,636 B2 * | 3/2009 | McGuire et al. | 717/168 |
| 7,526,771 B2 * | 4/2009 | Roman et al. | 719/316 |
| 7,552,430 B2 * | 6/2009 | Napier et al. | 717/169 |
| 7,730,123 B1 * | 6/2010 | Erickson et al. | 709/203 |
| 7,823,147 B2 * | 10/2010 | Moshir et al. | 717/173 |
| 8,060,874 B2 * | 11/2011 | Rengarajan et al. | 717/177 |
| 8,065,740 B2 * | 11/2011 | Rive et al. | 726/26 |
| 8,074,217 B2 * | 12/2011 | James et al. | 717/175 |
| 8,095,923 B2 * | 1/2012 | Harvey et al. | 717/171 |
| 8,146,072 B2 * | 3/2012 | Trueba | 717/170 |
| 8,266,211 B2 * | 9/2012 | Smith et al. | 709/204 |

OTHER PUBLICATIONS

Crameri et al, "Staged deployment in mirage and integrated software upgrade tetsing and distribution system", ACM SOSP, pp. 221-236, 2007.*
Pukall et al, "JavaAdaptor: unrestricted dynamic software updates for Java", ACM ICSE, pp. 989-991, 2011.*
Manna, "Dynamic software update for component based distributed systems", ACM WCOP, pp. 1-8, 2011.*
Samuel et al, "Survivable key compromise in software update system", ACM CCS, pp. 61-72, 2010.*
Mikael et al., "Preserving the Scholarly Side of the Web", Proceedings of the Fourth Latin American Web Congress, Oct. 2006, pp. 162-171 (10 pages).

\* cited by examiner

*Primary Examiner* — Anil Khatri
(74) *Attorney, Agent, or Firm* — Yee & Associates, P.C.; Jeffrey S. LaBaw (57) ABSTRACT

An upgrade analysis unit can include functionality to analyze a customized software product and compute a convenience for using the upgrade toolkit. The upgrade analysis unit automatically generates an upgrade approach based on the convenience. The upgrade approach identifies software product modules recommended for automatic upgrade with the upgrade toolkit.

22 Claims, 4 Drawing Sheets

AUTOMATICALLY RECOMMENDING AN UPGRADE APPROACH FOR A CUSTOMIZABLE SOFTWARE PRODUCT

BACKGROUND

Embodiments of the inventive subject matter generally relate to the field of computers, and, more particularly, to automatically recommending an upgrade approach for a customizable software product.

Some software products, such as IBM® Tivoli Monitoring, can be customized by a customer to fit the customer's unique environment. Customization of a software product can range from specification of new configuration parameters to completely rewritten code modules. Upgrading a customized software product is more complicated than upgrading software in an out-of-the-box configuration. Software vendors typically provide toolkits for upgrading software products in out-of-the-box configurations and may also be able to manage some level of customer customization.

SUMMARY

Embodiments include a method directed to comparing an installed software product to an out-of-the-box configuration of the software product. The installed software product comprises a set of one or more installed modules installed on an electronic device. A convenience value is computed that represents convenience of using an automatic upgrade toolkit for upgrading the installed software product. A variance value is computed that represents variance of the one or more installed modules with respect to an out-of-the-box configuration of the software product. The convenience value and the variance value are stored in a machine-readable media. A recommended approach is generated for upgrading the installed software product based, at least in part, on the convenience and variance values.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

Software vendors provide toolkits for automatically upgrading customized software products to new versions. However, the level of customization of a software product can reduce the effectiveness of the automatic upgrade because the toolkit may not be able to fully migrate deeply customized units of code or modules (e.g., functions, procedures, methods, blocks of code, segments of code, class instances, etc.) to the new version. Considerable time is wasted when an upgrade fails after running an automatic upgrade toolkit on a deeply customized environment. In some cases, an environment may comprise a few deeply customized modules and other modules with little to no customization ("mixed environment"). In a mixed environment, the efficiency of using an automatic upgrade toolkit may be unclear. An upgrade analysis unit, for example, implemented as part of an automatic upgrade toolkit, can include functionality to analyze a customized software product and compute a convenience for using the automatic upgrade toolkit. The upgrade analysis unit automatically generates a recommended upgrade approach based on the convenience. The recommended upgrade approach identifies software product modules recommended for automatic upgrade with the upgrade toolkit.

Figure 1:
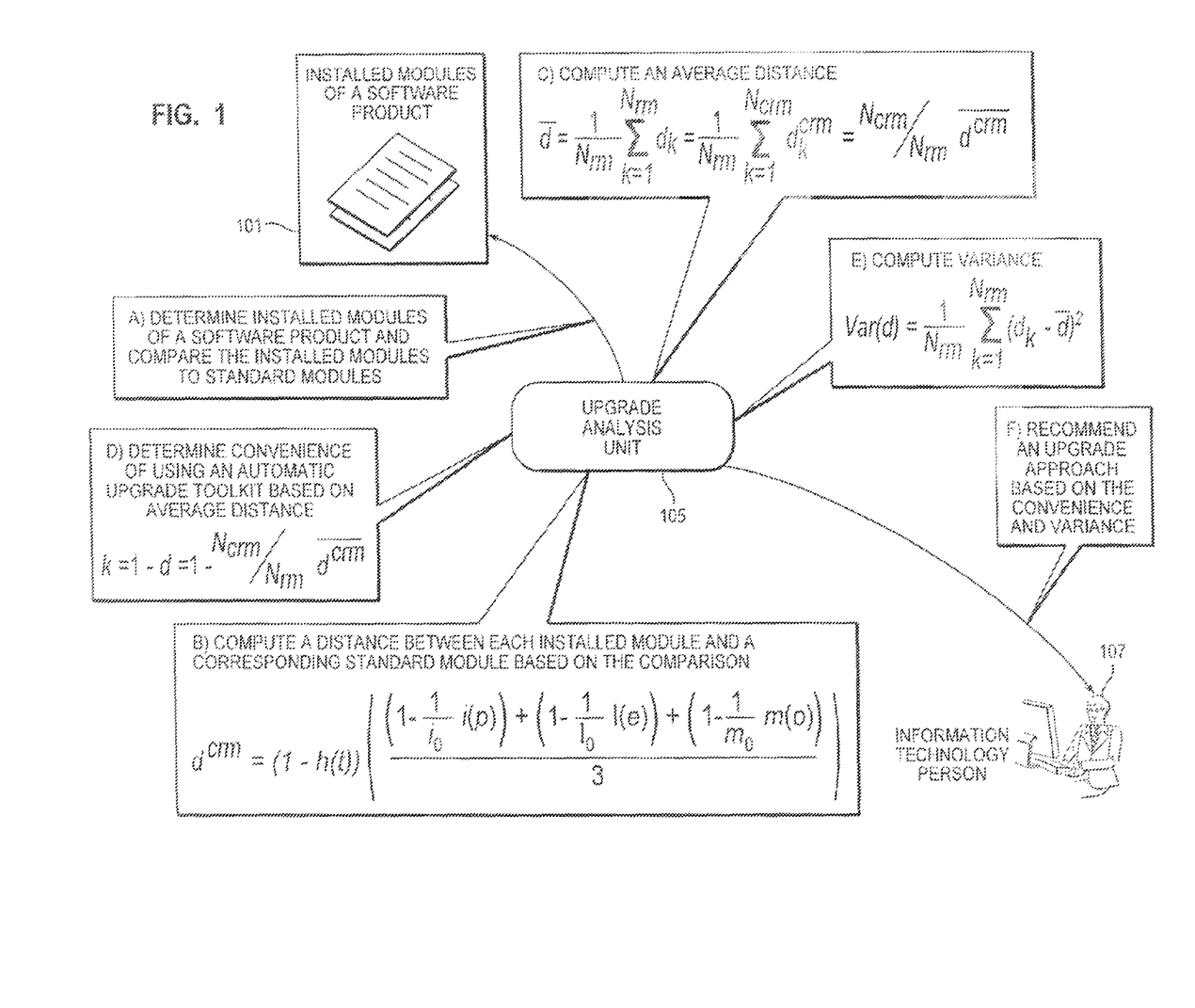
FIG. 1 is an example conceptual diagram of automatically recommending an upgrade approach for a software product.

FIG. 1 is an example conceptual diagram of automatically recommending an upgrade approach for a software product. At stage A, an upgrade analysis unit 105 determines installed modules 101 of a software product and compares the installed modules 101 to standard modules that represent an-out-of-the-box configuration (e.g., modules with default parameters and scripts). The software product may be installed on a single computer, over a network, on a server, etc. Examples of modules include scripts, classes, code segments, etc. The upgrade analysis unit 105 obtains a software inventory for the installed product either by performing a system scan itself, or retrieving the inventory information from a preinstalled software module which keeps track of the software inventory on one or more systems in the network. Such inventory operations are well known to those skilled in the art. Software products which keep track of a software inventory include IBM Tivoli Inventory, IBM Tivoli Configuration Manager and HP Asset Manager.

At stage B, the upgrade analysis unit 105 computes a distance between each installed module and a corresponding standard module. The distance quantifies how much an installed module deviates from a corresponding standard module. Installed modules 101 that have not been customized have a distance of 0. In this example, distance, d, is computed with Equation 1 discussed later in reference to FIG. 2.

$$d^{crm} = (1 - h(t)) \left( \frac{\left(1 - \frac{1}{i_0}i(p)\right) + \left(1 - \frac{1}{l_0}l(e)\right) + \left(1 - \frac{1}{m_o}m(o)\right)}{3} \right) \quad \text{Equation 1}$$

At stage C, the upgrade analysis unit 105 computes an average distance, d, based on the individual distance of each installed module. The average distance is computed in accordance with Equation 2, which is described in more detail later with reference to FIG. 2.

$$\overline{d} = \frac{1}{N_{rm}} \sum_{k=1}^{M_{crm}} d_k = \frac{1}{N_{rm}} \sum_{k=1}^{N_{crm}} d_k^{crm} = \frac{N_{crm}}{N_{rm}} \overline{d^{crm}} \quad \text{Equation 2}$$

At stage D, the upgrade analysis unit 105 determines a convenience, k, of using an automatic upgrade toolkit based on the computed average distance. The convenience is a scalar value that is the difference between the maximum convenience (i.e., for an out-of-the-box configuration) and the average distance. The maximum convenience is 1. Equation 3 expresses the convenience, k.

$$k = 1 - \overline{d} = 1 - \frac{N_{crm}}{N_{rm}} \overline{d^{crm}}$$ Equation 3

At stage E, the upgrade analysis unit 105 computes a variance, Var(d). The variance represents the distribution of customization in the installed modules of a software product. Equation 4 expresses the variance, Var(d).

$$\mathrm{Var}(d) = \frac{1}{N_{rm}} \sum_{k=1}^{N_{rm}} (d_k - \overline{d})^2$$ Equation 4

At stage F, the upgrade analysis unit 105 recommends an upgrade approach to an information technology person 107 based on the convenience and variance via a user interface on a computer system. The recommended approach is one of a completely automatic upgrade, a completely manual upgrade and a combination of automatic and manual upgrades. In addition, the recommended approach identifies modules to upgrade automatically and modules to upgrade manually when a mixed approach is recommended. The information technology person 107 uses the recommendation to configure the automatic upgrade toolkit. For example, tile information technology person 107 launches the automatic upgrade toolkit and selects an option for a customized upgrade installation. The automatic upgrade toolkit displays a list of modules to be installed. The information technology person 107 can remove modules to be upgraded manually from the list with various user interface techniques (e.g., un-checking a checkbox next to the module name).

The upgrade analysis unit 105 may be independent of the automatic upgrade toolkit. For example, a software vendor may provide an upgrade analysis tool that is capable of analyzing a plurality of different software products. The upgrade analysis unit 105 may be a plug-in to the automatic upgrade toolkit. For example, the automatic upgrade toolkit analyzes the installed modules 101 to recommend an upgrade approach before starting an upgrade process. In addition, the upgrade analysis 105 unit may be able to configure and/or invoke the automatic upgrade toolkit to upgrade installed modules based on the recommended upgrade approach.

Figure 2:
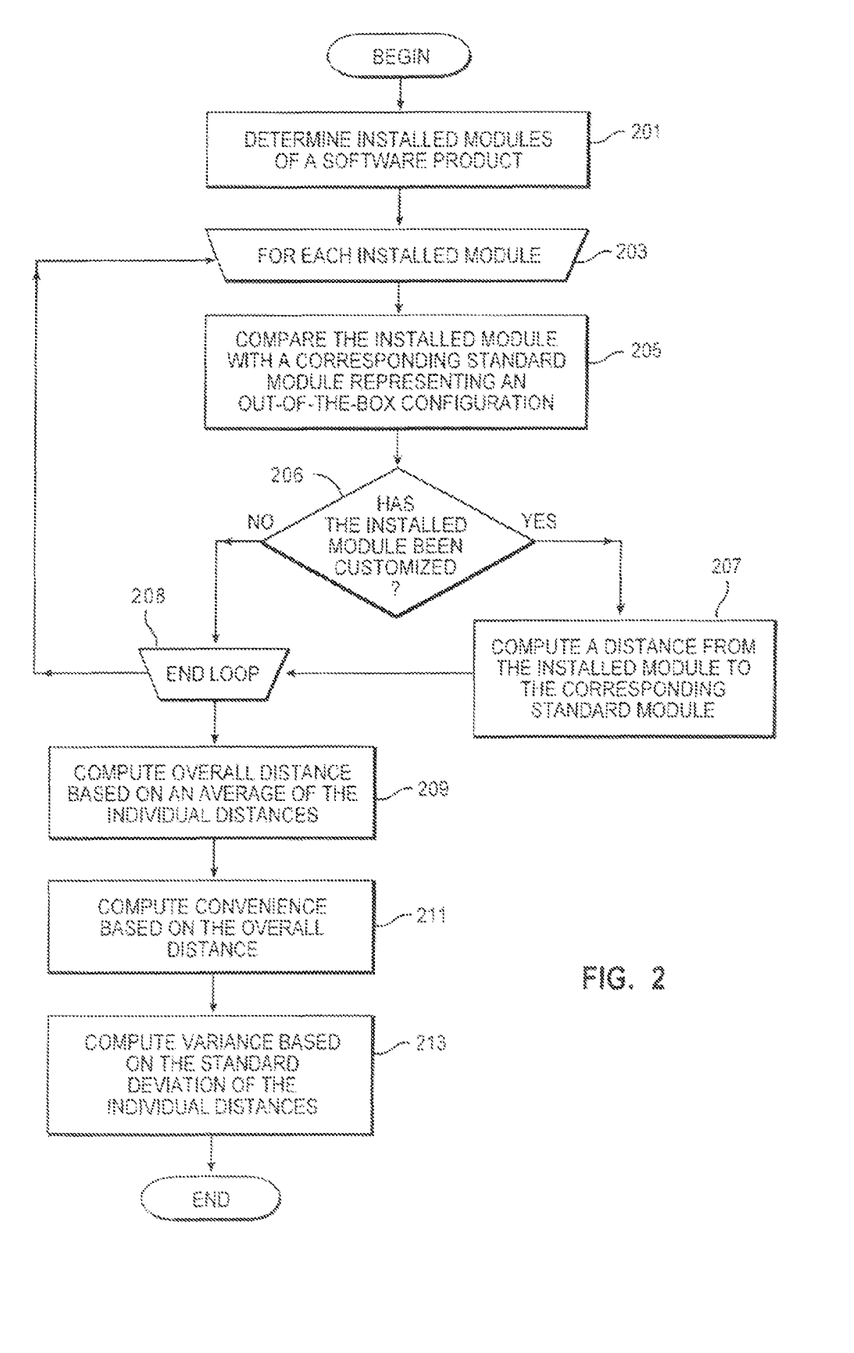
FIG. 2 is a flowchart depicting example operations for computing convenience and variance.

FIG. 2 is a flowchart depicting example operations for computing convenience and variance. Flow begins at block 201, where installed modules of a software product are determined. The installed modules are installed on au electronic device (e.g., a computer, a server, etc) and may be distributed over a network. The following examples are based on IBM Tivoli Monitoring (ITM). ITM manages information technology (IT) infrastructure including operating systems, databases and servers.

At block 203, a loop for each installed module begins.

At block 205, the installed module is compared with a standard module of an out-of-the-box configuration.

At block 206, it is determined if the installed module has been customized. If the installed module has been customized, flow continues at block 207. If the installed module has not been customized, flow continues at block 208.

At block 207, a distance between the installed module and the corresponding standard module is computed. Since the distance between an installed module that has not been customized and a standard module is by definition 0, it is not necessary to compute distances for installed modules that have not been customized. For example, ITM allows customers to customize resource models (RMs). RMs specify the rules of operation for a resource including operational logging, levels of performance, metrics, etc. Examples of resources are ports, central processing units, etc. The RMs can detect and correct operation errors. The distance for each customized resource module (CRM), $d^{crm}$, is computed by Equation 1:

$$d^{crm} = (1 - h(t)) \left( \frac{\left(1 - \frac{1}{i_0} i(p)\right) + \left(1 - \frac{1}{l_0} l(e)\right) + \left(1 - \frac{1}{m_0} m(o)\right)}{3} \right).$$ Equation 1

The distance, $d^{crm}$, depends on four functions, h(t), i(p), l(e) and m(o). Function h(t) depends on the CRM complexity class. Complexity classes are predefined levels encoded in an upgrade analysis unit. The complexity classes are pre-determined based on a software vendor's experience. Equation 5 expresses the complexity classes.

$$h(t) = t(t)^q \text{ where } t(t) \begin{cases} A = 0.6 \\ B_1 = 0.4 \\ B_2 = 0.2 \\ C = 0.1 \end{cases}$$ Equation 5

In this example, there are four complexity classes, but the granularity may be finer (or coarser) in other examples. The parameter q is a tuning parameter that may be refined by either the software vendor or customer. Tuning parameters and initial conditions are defined below. The four complexity classes are:

Level A. The RM is realized with a standard RM; generally only thresholds or parameters are added and the decision logic does not vary from decision logic in a corresponding standard RM.

Level B1. The RM decision logic is completely re-written and the metrics are collected using ITM standard libraries.

Level B2. The RM decision logic is completely re-written and the metrics are collected using specific scripts directly invoked from the decision logic.

Level C. The RM is completely new, both the decision logic and libraries have been developed by the customer.

The more complex the customizations as represented by the functions m(o), l(e), and i(p) become, the closer the multiplier that will be applied to h(t) in the distance equation will be to 1. As the customizations represented by the functions m(o), i(p), and l(e), are closer to standard, then the resulting multiplier that is applied to h(t) will be a smaller fractional multiplier, thus reducing the effect of h(t). The expression captures the relationship between class complexity and the customizable aspects.

The function i(p) depends on a number of profiles that reference the CRM, where p is the number of profiles. A profile comprises one or more RMs that enables simultaneous monitoring of multiple resources. Equation 6 expresses the function i(p).

$$i(p) = \frac{1}{i_0} \frac{p^n}{p^n + p_0} \quad \text{Equation 6}$$

When the number of profiles increase, in particular when the number is very large, the function increases asymptotically towards 1. The parameters n, and $i_0$ are tuning parameters and $p_0$ is an initial condition.

The function l(e) depends on the number of subscribers to each profile referencing the CRM, where e is the number of subscribers. Equation 7 expresses function l(e).

$$l(e) = \frac{1}{l_0} \frac{e^m}{e^m + e_0} \quad \text{Equation 7}$$

When the number of subscribers increases, in particular when the number is very large, the function increase asymptotically towards 1. The parameters m, and $l_0$ are tuning parameters and $e_0$ is an initial condition.

The function m(o) depends on the number of resources in the CRM, where o is the number of resources. Equation 8 expresses the function m(o).

$$m(o) = \frac{1}{m_0} \frac{o^l}{o^l + o_0} \quad \text{Equation 8}$$

When the number of monitored objects increases, in particular when the number is very large, the function increases asymptotically towards 1. It is expected that m(o) has a lower weight on the total convenience because of the values of tuning parameter for exponent, l, given below. The parameters l, and $m_0$ are tuning parameters and $o_0$ is an initial condition.

A first tuning of the equations produces a base for tuning parameters and initial conditions which is expressed in Equation 9.

n=m=l=1

$i_0=l_0=m_0=1$ $p_0=e_0=o_0=200$ p=q=2     Equation 9

The functions i(p), l(e) and m(o) correspond to the ITM example. Similar equations can characterize aspects of other software products. One or more functions, perhaps of similar form as i(p), l(e) and m(o), that characterize aspects of particular software products and/or aspects of software products in general can be used in calculating distance. The one or more functions characterize the customizable aspects of the installed modules. Examples of customized aspects include number of profiles referencing a customized module, number of modules referencing the customized module, etc.

At block 208, the loop for each installed module ends.

At block 209, an overall distance is computed based on an average of the individual distances of the CRMs. For example, the overall distance, l, is computed with Equation 2:

$$\bar{d} = \frac{1}{N_{rm}} \sum_{k=1}^{N_{rm}} d_k = \frac{1}{N_{rm}} \sum_{k=1}^{N_{crm}} d_k^{crm} = \frac{N_{crm}}{N_{rm}} \overline{d^{crm}} \quad \text{Equation 2}$$

Parameter $N_{rm}$ is the total number of installed RMs. Parameter $N_{crm}$ is the number of CRMs. The overall distance takes into account both uncustomized RMs and CRMs.

At block 211, a convenience is computed based on the overall distance. For example, the convenience, k, is computed with Equation 3:

$$k = 1 - \bar{d} = 1 - \frac{N_{crm}}{N_{rm}} \overline{d^{crm}} \quad \text{Equation 3}$$

Convenience represents the difference between the maximum convenience of a standard environment and the overall distance. The maximum convenience value is 1. The expression for k, indicated with Equation 3 yields convenience values between 0 and 1.

At block 213, a variance is computed based on the standard deviation of the individual distances of the CRMs. Variance is expressed with the function Var(x), where μ is the expected value and σ is the standard deviation in Equation 10.

μ=E(x)

Var(x)=E((x−μ)²)

σ=√Var(x)     Equation 10

Equation 11 expresses variance for a finite population:

$$\text{Var}(x) = \frac{1}{N} \sum_{i=1}^{N} (x_i - \bar{x})^2 \quad \text{Equation 11}$$

In this example, variance, Var(d), is computed in accordance with Equation 4:

$$\text{Var}(d) = \frac{1}{N_{rm}} \sum_{k=1}^{N_{rm}} (d_k - \bar{d})^2 \quad \text{Equation 4}$$

The variance characterizes a customized environment and provides a mathematical description of the distribution of customizations over the customized environment. The variance provides an estimate of a percentage of population within the interval of 1σ, 2σ or 3σ from the average value. If a normal distribution can be assumed the estimate is more precise. But the estimate remains valid for a distribution due to Chebyshev's inequality.

Some embodiments may take into account that a distribution may not be symmetric. A measure of the asymmetry of the probability distribution, "skewness," may be calculated. In most cases, the variance is sufficient to characterize the distribution even though the distribution may not be symmetric.

After the variance and convenience are computed, a recommended upgrade approach is automatically generated.

Generation of the recommended upgrade approach can vary with implementation. For example, the upgrade analysis unit can generate the recommended upgrade approach as part of a toolkit or separately. The upgrade analysis unit can communicate the computed variance and convenience to an automatic upgrade toolkit for generation of the recommended upgrade approach.

Figure 3:
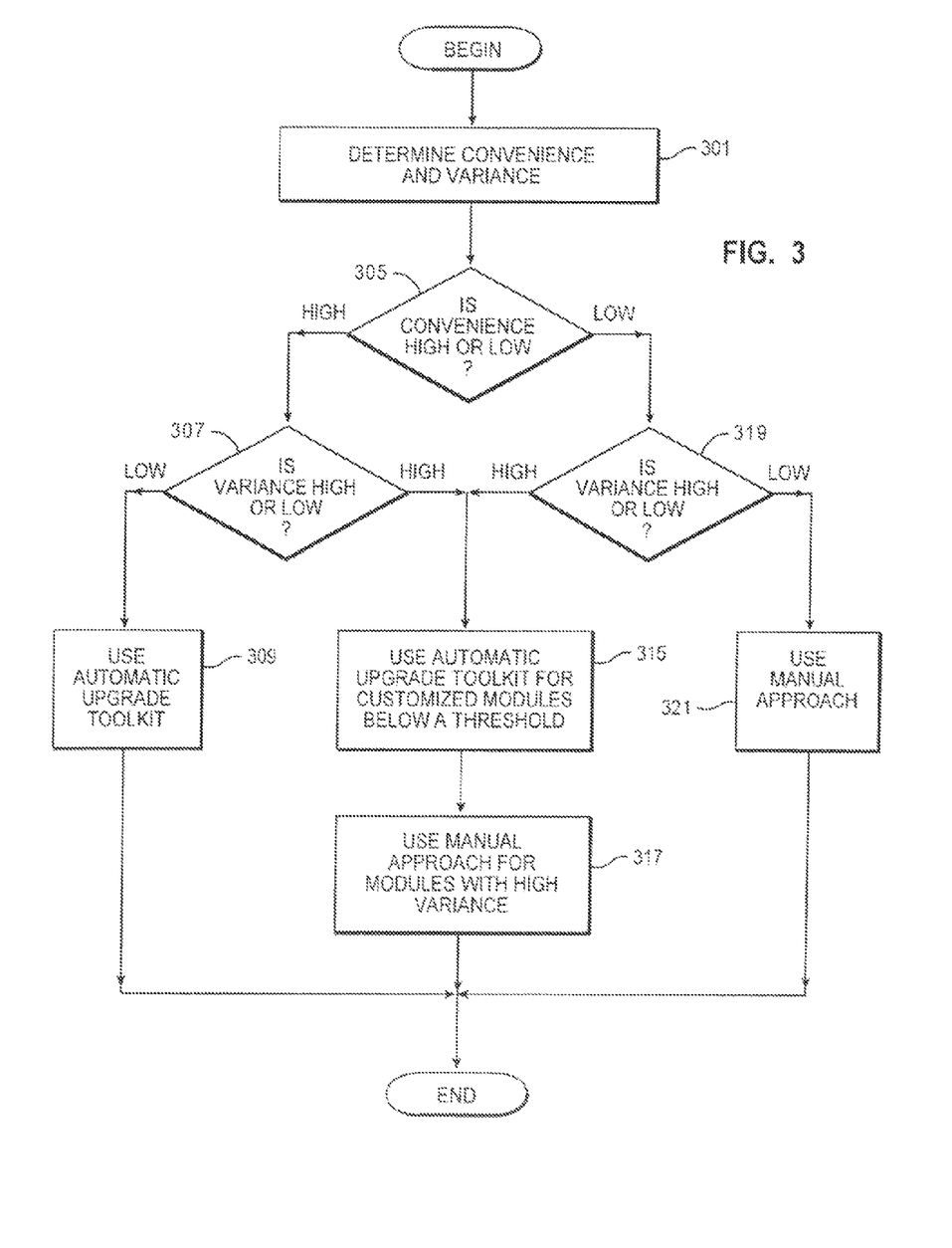
FIG. 3 is a flowchart depicting example operations for generating a recommended approach based on convenience and variance.

FIG. 3 is a flowchart depicting example operations for generating a recommended approach based on convenience and variance. Flow begins at block 301, where convenience and variance are determined.

At block 305, it is determined if convenience is high or low. The thresholds for high or low convenience may be default values or may be specified by a user of an upgrade analysis unit. If convenience is high, flow continues at block 307. If convenience is low, flow continues at block 319.

At block 307, it is determined if variance is high or low. The thresholds for high or low variance may be default values or may be specified by a user of an upgrade analysis unit. If variance is low, flow continues at block 309. If variance is high, flow continues at block 311.

At block 309, use of the automatic upgrade toolkit is recommended for all installed modules and flow ends. In this case, high convenience suggests that a customized environment is close to a standard environment. The low variance implies that each installed module does not vary far from a corresponding standard module and the automatic upgrade toolkit is suitable for upgrading all installed modules.

If variance was determined to be high, then blocks 315 and 317 are performed. At block 315, use of the automatic upgrade toolkit is recommended for one or more installed modules with distances below a threshold. The threshold may be a default value or specified by a user of an upgrade analysis unit. For example, the threshold may be 2 standard deviations above the average distance. Installed modules with distances below the threshold are suitable for being upgraded by the automatic upgrade toolkit.

At block 317, use of the automatic upgrade toolkit is recommended for installed modules with distances above the threshold. Installed modules with distances above the threshold are not suitable for being upgraded by the automatic upgrade toolkit. If convenience was determined to be low at block 305, then it is determined if variance is high or low at block 319. If variance is high, flow continues at block 315. If variance is low, flow continues at block 321.

At block 321, a manual approach is recommended for all installed modules. In this case, low convenience suggests that a customized environment is far from a standard environment. The low variance implies that each installed module does not vary greatly from a corresponding standard module, the low convenience characterization applies to at least a significant number of the installed modules, and the automatic upgrade toolkit is not suitable to upgrade the installed modules of the software product.

It should be understood that the depicted flowchart are examples meant to aid in understanding embodiments and should not be used to limit embodiments or limit scope of the claims. Embodiments may perform additional operations, fewer operations, operations in a different order, operations in parallel, and some operations differently. For instance, referring to FIG. 2, the operations for comparing an installed module with a corresponding standard module and determining that the installed module has been customized may occur in parallel.

Embodiments may take the form of an entirely hardware embodiment, a software embodiment (including firmware, resident software, micro-code, etc.) in computer storage media or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium. The computer program product may be stored on the computer storage medium associated with one system and downloaded over a communications network to the computer storage medium associated with a second system.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 4:
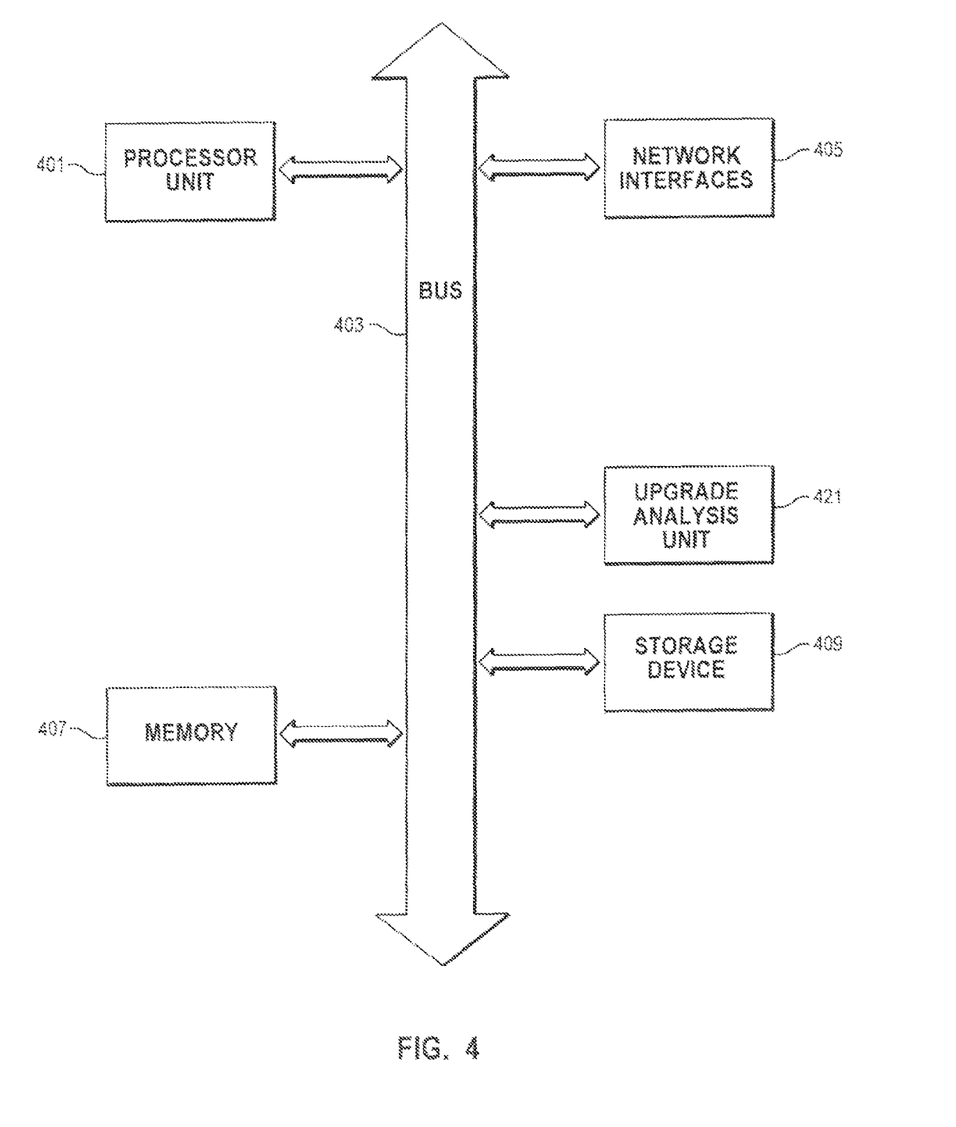
FIG. 4 depicts an example computer system.

FIG. 4 depicts an example computer system. A computer system includes a processor unit 401 (possibly including multiple processors, multiple cores, multiple nodes, and/or implementing, multi-threading, etc.). The computer system includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 403 (e.g., PCI, ISA, PCI-Express, HyperTransport®, InfiniBand®, NuBus, etc.), a network interface 405 (e.g., an ATM interface, an Ethernet interface, a Frame Relay interface, SONET interface, wireless interface, etc.), and a storage device(s) 409 (e.g., optical storage, magnetic storage, etc.). The computer system also includes an upgrade analysis unit 421 that analyzes an installed software product to determine a convenience of using an automatic upgrade toolkit and generates a recommended upgrade approach based, at least in part, on the convenience. ITM and other software products may be installed across a network causing installed modules to be distributed across the network. If installed modules are distributed, the upgrade analysis unit 421 accesses the installed modules via the network interface 405. Any one of the above described functionalities may be partially (or entirely) implemented in hardware and/or on the processing unit 401. For example, the functionality may be implemented with an application specific integrated circuit, in logic implemented in the processing unit 401, in a co-processor on a peripheral device or card, etc. Further, realizations may include fewer or additional components not illustrated in FIG. 4 (e.g., video cards, audio cards, additional network interfaces, peripheral devices, etc.). The processor unit 401, the storage device(s) 409, and the network interface 405 are coupled to the bus 403. Although illustrated as being coupled to the bus 403, the memory 407 may be coupled to the processor unit 401.

While the embodiments are described with reference to various implementations and exploitations, it will be understood that these embodiments are illustrative and that the scope of the inventive subject matter is not limited to them. In general, techniques for automatically recommending an upgrade approach for a customizable software product as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
providing a software inventory, wherein the software inventory includes an installed software product having a set of one or more installed modules in the memory of an electronic device;
comparing the installed software product to an out-of-the-box configuration of the software product;
a computer computing a convenience value that represents convenience of using an automatic upgrade toolkit for upgrading the installed software product on the electronic device;
computing a variance value that represents variance of the set of one or more installed modules with respect to the out-of-the-box configuration of the software product; and
generating a recommended approach for upgrading the installed software product based, at least in part, on the convenience and variance values, wherein the recommended approach identifies at least one of the set of installed modules to upgrade automatically and at least one of the installed modules to upgrade manually.

2. The method of claim 1, wherein said computing the convenience value that represents convenience of using the upgrade toolkit for upgrading the installed software product on the electronic device comprises computing an overall distance between the installed software product and the out-of-the-box configuration of the software product.

3. The method of claim 2, wherein the overall distance comprises an average of individual distances between each of the set of one or more installed modules and corresponding ones of a set of standard modules, wherein the set of standard modules represent the out-of-the-box configuration of the software product.

4. The method of claim 3, wherein the convenience value is a scalar value that is the difference between a maximum convenience for the out-of-the-box configuration of the software product and the overall distance.

5. The method of claim 1, wherein the recommended approach indicates one of a completely automatic upgrade, a completely manual upgrade and a combination of automatic and manual upgrades.

6. The method of claim 1 further comprising configuring an automatic upgrade toolkit to upgrade the installed modules on the electronic device based on the recommended approach.

7. The method of claim 6 further comprising invoking the automatic upgrade toolkit to upgrade the installed modules on the electronic device.

8. A method comprising:
providing a software inventory, wherein the software inventory includes an installed software product having a set of one or more installed modules in the memory of an electronic device;
comparing the set of one or more installed modules of a software product to a set of one or more standard modules of the software product, wherein the one or more standard modules represent an out-of-the-box configuration of a software product;
computing a set of one or more customization distance values between the set of one or more installed modules and the set of one or more standard modules, wherein a first of the set of one or more customization distance values represents a degree of customization of a first of the set of installed modules that separates the first of the set of installed modules from a first corresponding one of the set of standard modules;
computing an average of the customization distance values;
computing a convenience value based, at least in part, on the average of the customization distance values, wherein the convenience value represents convenience of using an automatic upgrade toolkit to upgrade the installed modules;
computing a variance value based on a standard deviation of each of the set of customization distance values with respect to the average of the set of customization distance values; and
generating for electronic display a recommended approach for upgrading the installed modules of the software product on the electronic device based, at least in part, on the computed convenience and variance values, wherein the recommended approach identifies at least one of the set of installed modules to upgrade automatically and at least one of the installed modules to upgrade manually.

9. The method of claim 8, wherein the convenience is a scalar value that is the difference between a maximum convenience for the out-of-the-box configuration of the software product and an average of the set of customization distance values.

10. The method of claim 8, wherein the recommended approach indicates one of a completely automatic upgrade, a completely manual upgrade and a combination of automatic and manual upgrades.

11. One or more tangible machine-readable storage devices having stored therein program code which, when executed a set of one or more processor units, causes the set of one or more processor units to perform operations that comprise:
 providing a software inventory, wherein the software inventory includes an installed software product having a set of one or more installed modules in the memory of an electronic device;
 comparing the installed software product to an out-of-the-box configuration of the software product, wherein the installed software product comprises a set of one or more installed modules;
 generating a convenience value that represents convenience of using an automatic upgrade toolkit for upgrading the installed software product;
 generating a variance value that represents variance of the set of one or more installed modules with respect to the out-of-the-box configuration of the software product; and
 generating a recommended approach for upgrading the installed software product based, at least in part, on the convenience and variance values, wherein the recommended approach identifies at least one of the set of installed modules to upgrade automatically and at least one of the set of installed modules to upgrade manually.

12. The machine-readable media of claim 11, wherein said operation of generating the convenience value that represents convenience of using the upgrade toolkit for upgrading the installed software product comprises computing an overall distance between the installed software product and the out-of-the-box configuration of the software product.

13. The machine-readable media of claim 12, wherein the overall distance comprises an average of individual distances between each of the set of one or more installed modules and corresponding ones of a set of standard modules, wherein the set of standard modules represent the out-of-the-box configuration of the software product.

14. The machine-readable media of claim 13, wherein the convenience value is a scalar value that is the difference between a maximum convenience for the out-of-the-box configuration of the software product and the overall distance.

15. The machine-readable media of claim 11, wherein the recommended approach indicates one of a completely automatic upgrade, a completely manual upgrade and a combination of automatic and manual upgrades.

16. The machine-readable media of claim 11, wherein the operations further comprise configuring an automatic upgrade toolkit to upgrade the installed modules based on the recommended approach.

17. The machine-readable media of claim 16, wherein the operations further comprise invoking the automatic upgrade toolkit to upgrade the installed modules.

18. One or more tangible machine-readable storage devices having stored therein program code which, when executed a set of one or more processor units, causes the set of one or more processor units to perform operations that comprise:
 comparing a set of one or more installed modules of a software product to a set of one or more standard modules of the software product, wherein the one or more standard modules represent an out-of-the-box configuration of a software product;
 computing a set of one or more customization distance values between the set of one or more installed modules and the set of one or more standard modules,
 wherein a first of the set of one or more customization distance values represents a degree of customization of a first of the set of installed modules that separates the first of the set of installed modules from a first corresponding one of the set of standard modules;
 computing an average of the customization distance values;
 computing a convenience value based, at least in part, on the average of the customization distance values, wherein the convenience value represents convenience of using an automatic upgrade toolkit to upgrade the installed modules;
 computing a variance value based on a standard deviation of each of the set of customization distance values with respect to the average of the set of customization distance values; and
 generating a recommended approach for upgrading the installed modules of the software product based, at least in part, on the computed convenience and variance values, wherein the recommended approach identifies at least one of the set of installed modules to upgrade automatically and at least one of the installed modules to upgrade manually.

19. The machine-readable media of claim 18, wherein the convenience is a scalar value that is the difference between a maximum convenience for the out-of-the-box configuration of the software product and an average of the set of customization distance values.

20. The machine-readable media of claim 18, wherein the recommended approach indicates one of a completely automatic upgrade, a completely manual upgrade and a combination of automatic and manual upgrades.

21. An apparatus comprising:
 a set of one or more processing units;
 a network interface; and
 an upgrade analysis unit operable to,
  compare an installed software product to an out-of-the-box configuration of the software product, wherein the installed software product comprises a set of one or more installed modules;
  generate a convenience value that represents convenience of using an automatic upgrade toolkit for upgrading the installed software product;
  generate a variance value that represents variance of the set of one or more installed modules with respect to the out-of-the-box configuration of the software product; and
  generate a recommended approach for upgrading the installed software product based, at least in part, on the convenience and variance values, wherein the recommended approach identifies at least one of the set of installed modules to upgrade automatically and at least one of the installed modules to upgrade manually.

22. The apparatus of claim 21, wherein the upgrade analysis unit comprises one or more machine-readable media.

* * * * *